United States Patent [19]
Peron

[11] Patent Number: 5,822,203
[45] Date of Patent: Oct. 13, 1998

[54] METHOD AND DEVICE FOR LIMITING THE CURRENT SURGE IN A CAPACITOR ASSOCIATED WITH A RECTIFIER

[75] Inventor: Benoît Peron, Tours, France

[73] Assignee: SGS-Thomson Microelectronics S.A., Saint Genis, France

[21] Appl. No.: 755,195

[22] Filed: Nov. 25, 1996

[30] Foreign Application Priority Data

Nov. 30, 1995 [FR] France ................................... 95 14381

[51] Int. Cl.[6] ................................................. H02M 7/00
[52] U.S. Cl. ............................................ 363/125; 323/908
[58] Field of Search ................................... 363/52, 53, 54, 363/84, 85, 125, 126, 128; 323/908

[56] References Cited

U.S. PATENT DOCUMENTS

| | | | |
|---|---|---|---|
| 3,852,654 | 12/1974 | Gyugyi et al. | 363/161 |
| 4,019,100 | 4/1977 | Barrus | 361/186 |
| 4,161,022 | 7/1979 | Kanazawa et al. | 363/88 |
| 4,689,548 | 8/1987 | Mechlenburg | 323/243 |
| 4,811,189 | 3/1989 | Harvest et al. | 363/53 |
| 5,202,819 | 4/1993 | Min | 361/436 |
| 5,621,631 | 4/1997 | Vinciarelli et al. | 363/89 |

*Primary Examiner*—Matthew V. Nguyen
*Attorney, Agent, or Firm*—Wolf, Greenfield & Sacks, P.C.

[57] ABSTRACT

A device and associated method for limiting a current surge in a capacitor connected to the output of a rectifying bridge having its input connected to an a.c. voltage, the bridge being a composite bridge and being associated with means for synchronizing the turning-on of the bridge from zero crossings of the voltage of the a.c. power supply.

5 Claims, 4 Drawing Sheets

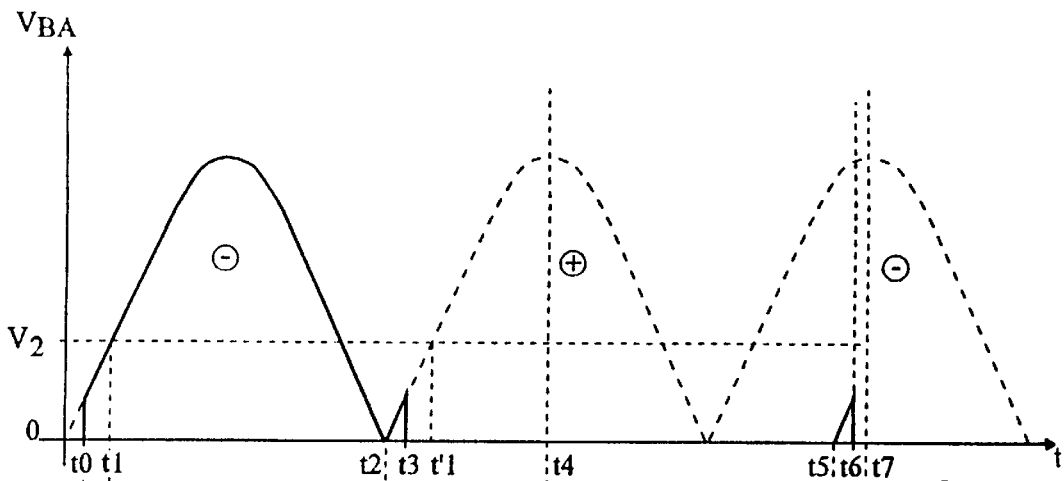
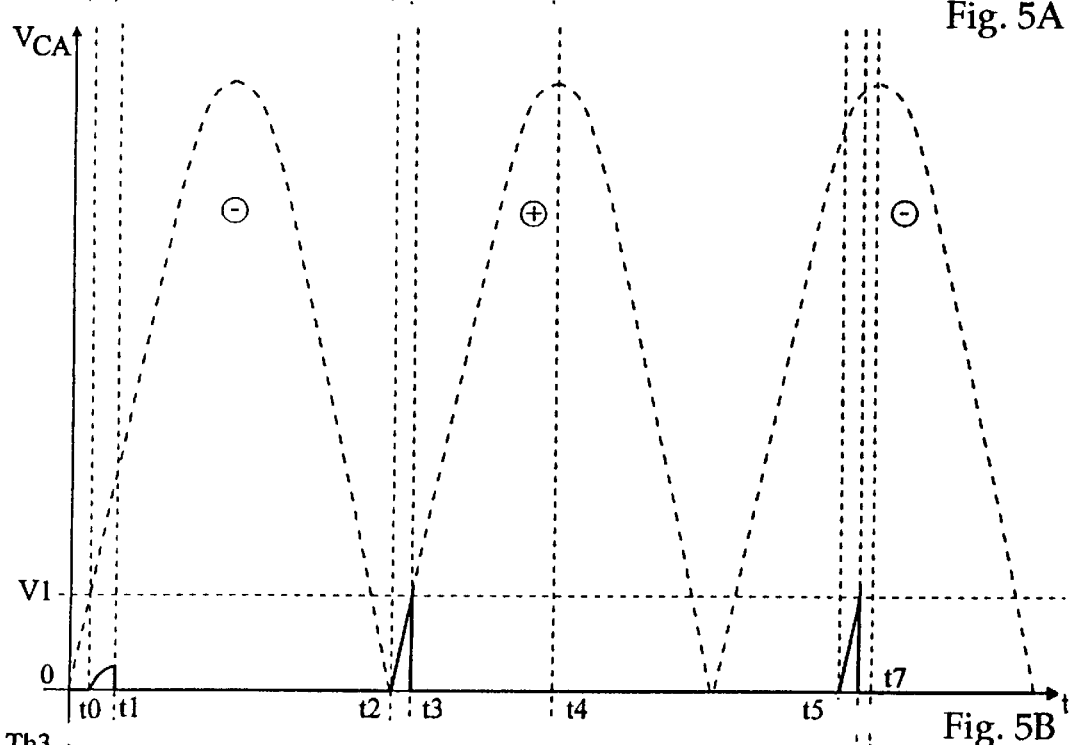
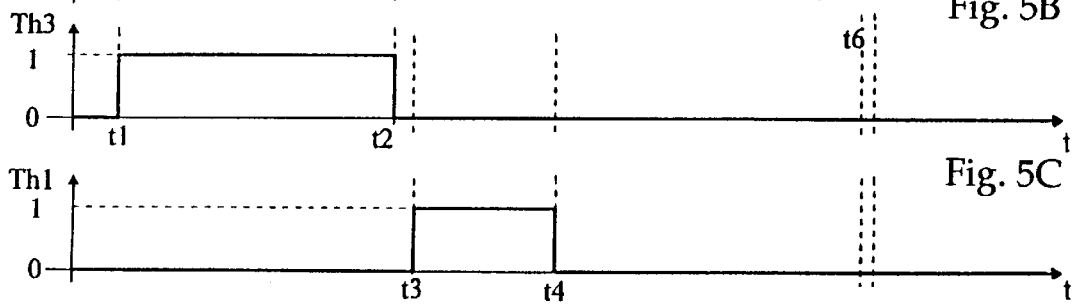
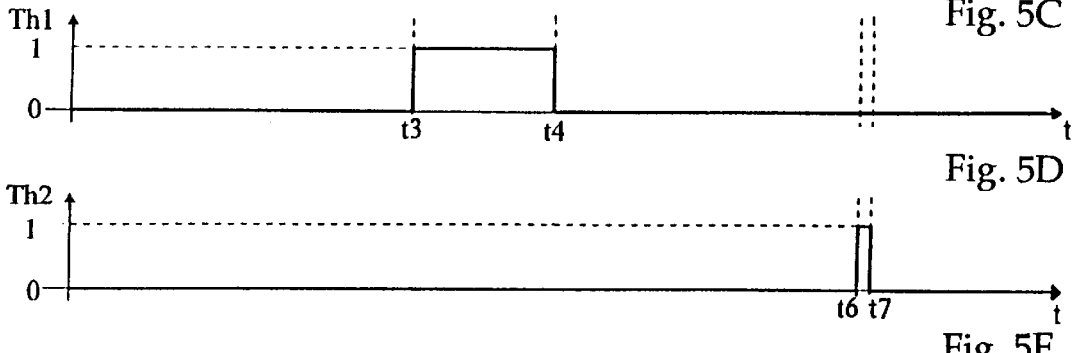
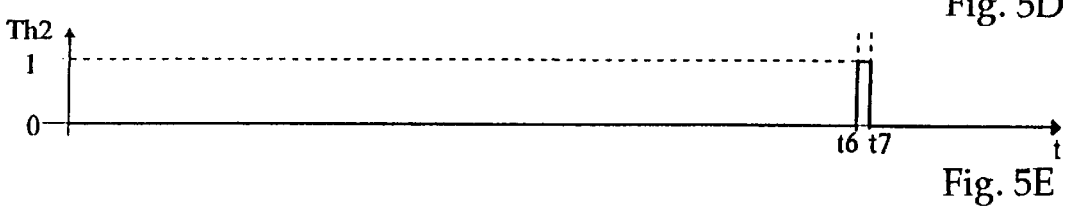

METHOD AND DEVICE FOR LIMITING THE CURRENT SURGE IN A CAPACITOR ASSOCIATED WITH A RECTIFIER

BACKGROUND OF THE INVENTION

1. Field of the Invention

The present invention relates generally to power converters for providing d.c. rectified power supplies, and, more particularly, to a circuit for limiting the current surge in a storage capacitor at the powering-on of a rectifier.

2. Discussion of the Related Art

FIG. 1 is a schematic block diagram of an exemplary conventional circuit for limiting the current surge in a storage capacitor Cf associated with a rectifier 2. The rectifier 2 is connected, through terminals E1 and E2, to an a.c. power supply and provides, on terminals P and M, a d.c. rectified power supply. Typically, terminal M is a ground terminal. Terminals P and M supply a load 1 generally associated with a power converter such as a switched mode power supply. A device for correcting the power factor may be provided, in which case the storage capacitor Cf may be included as part of the device.

The powering-on of the conventional circuit shown in FIG. 1 is generally performed by means of a manually- or automatically-controlled switch 4, located between the a.c. power supply and the rectifier 2. The powering-on of the circuit causes a current surge ranging from several tens to several hundreds of amperes due to the initial charge of capacitor Cf. To avoid this, a device 5 for limiting the current surge is commonly placed between terminal P and capacitor Cf.

Device 5 generally includes a series resistance Rs. In order to avoid the resistor Rs from continuously dissipating power, a switch 6 is generally provided to short-circuit the resistor Rs once the power converter has reached a steady state. The control line 7 of switch 6 is typically provided by the power converter and may be based on, for example, a measurement of the charge current of capacitor Cf.

A disadvantage of a conventional device such as shown in FIG. 1 is that the presence of a series resistance on the rectified power line results in significant power consumption by the resistor Rs during the initial transient charge phase of capacitor Cf.

Another disadvantage of such a conventional device for limiting the current surge upon power-on is that it requires auxiliary circuits that continuously dissipate power. These auxiliary circuits are required to cause and maintain the short-circuiting of resistance Rs in a steady state. For example, if the power converter includes a transformer, the control line 7 of switch 6 generally requires an additional secondary winding. Further, the very presence of switch 6 on the positive rectified power supply line results in steady-state power consumption due to the resistance of switch 6 when it is closed.

Another disadvantage of the device of FIG. 1 is that, should a mains failure occur for a duration such that the voltage across capacitor Cf dissipates below the range associated with steady state, the switch 6 opens, causing the power consumption by resistance Rs.

Another disadvantage is that the operation of the device for limiting the current surge can be altered in case of a temporary drop of the mains voltage. This may occur, for example, after a strong current consumption of another load connected to the electric network. Particularly, when switch 6 is controlled by a relay, and assuming that the voltage drop remains within the devised operating range (that is, switch 6 remains in the "on" state), a very large current peak appears as the mains voltage rises back to the initial level.

SUMMARY OF THE INVENTION

The present invention aims at overcoming the disadvantages of conventional devices for limiting the current surge in a capacitor associated with a rectifier by providing a device with reduced steady-state power consumption.

The invention also aims at providing a device with a steady-state power consumption that is independent of the mains voltage and frequency.

The invention also aims at providing a device which operates regardless of the type of load (resistive, capacitive, etc.), and has a power consumption that is independent of the type of load.

The invention also aims at providing a device which does not require an auxiliary power supply for its control.

To achieve these objectives, the present invention provides a method for limiting the current surge in a capacitor connected to the output of a rectifying bridge having its input connected to an a.c. power supply, consisting in:

using a composite bridge; and authorizing the bridge to conduct only after a zero crossing of the a.c. voltage.

The present invention also provides a device for limiting a current surge in a capacitor connected to the output of a rectifying bridge having its input connected to an a.c. power supply, including means for synchronizing the turning-on of the bridge from the zero crossings of the a.c. power supply voltage, the bridge being preferably a composite bridge.

According to an embodiment of the present invention, the device includes a detector for detecting the zero crossing of the voltage at the input of the composite bridge and a controller for controlling switches of the composite bridge.

According to another embodiment of the present invention, the detector includes at least two differential inputs receiving the a.c. power supply. The controller includes at least two outputs for respectively controlling the composite bridge switches.

According to another embodiment of the present invention, the bridge includes at least two diodes and at least two thyristors.

According to another embodiment of the present invention, each input of the detector is connected to an input of the composite bridge via a rectifying diode. The anodes of the rectifying diodes are connected to an output terminal of the composite bridge via a first resistive voltage dividing bridge. The midpoint of the first dividing bridge is connected, at least via a first Zener diode, to the gate of an auxiliary thyristor, the anode of which constitutes an output of the detector.

According to another embodiment of the present invention, the controller includes a second resistive voltage dividing bridge having its midpoint connected to the output of the detection block. The midpoint of the second dividing bridge is also connected, via a second Zener diode, to the anodes of at least two diodes, the respective cathodes of which constitute the outputs of the controller. The outputs are connected, respectively, to the gates of the thyristors of the composite bridge. In addition, a damping capacitor is mounted in parallel to the auxiliary thyristor.

According to another embodiment of the present invention, the resistive dividing bridges include resistors having resistance values such that the voltage across the damping capacitor is, at low frequencies, always substantially higher than the voltage between the midpoint of the first resistive dividing bridge and the cathode of the auxiliary transistor.

According to another embodiment of the present invention, the cathode of the auxiliary thyristor is connected to the cathodes of the rectifying diodes of the detector, the thyristors of the composite bridge being cathode-gate thyristors.

According to an embodiment of the present invention, the cathode of the auxiliary thyristor is connected to the output terminal of the composite bridge, the thyristors of the composite bridge being anode-gate thyristors.

BRIEF DESCRIPTION OF THE DRAWINGS

These and other objects, features and advantages of the present invention will become apparent from the following description of specific embodiments of the present invention, given by way of example with reference to the following drawings, wherein:

FIGS. 4A–4D and 5A–5E are timing diagrams illustrating the operation of a device according to the present invention;

DETAILED DESCRIPTION

Figure 1:
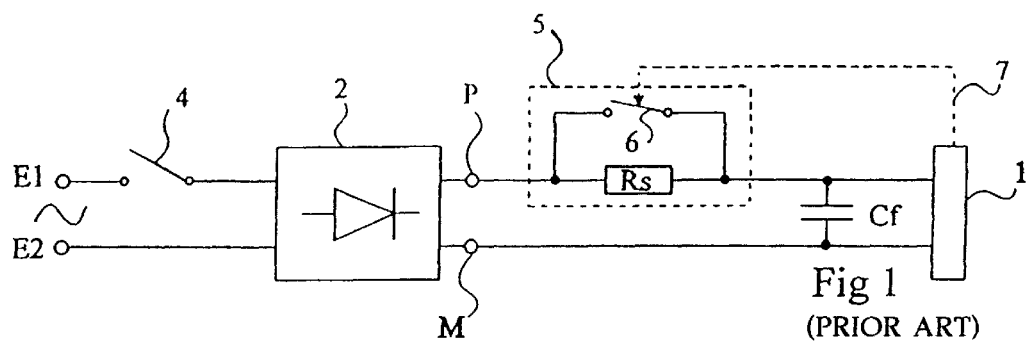
FIG. 1 is a schematic block diagram of a conventional circuit for limiting the current surge in a storage capacitor associated with a rectifier.

For clarity, the same components have been referred to by the same reference numerals in the different drawings. Similarly, the timing diagrams of FIGS. 4 to 7 are not to scale.

Figure 2:
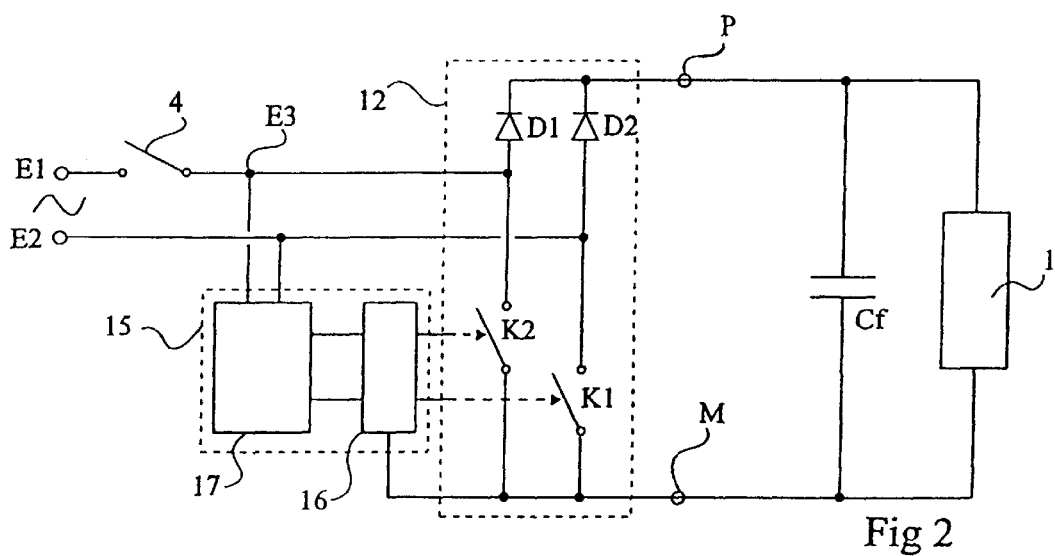
FIG. 2 is a schematic block diagram of an embodiment of a device for limiting the current surge according to the present invention.

FIG. 2 shows a preferred embodiment of a device of the present invention for limiting the current surge in a capacitor Cf associated with a rectifier 12 that supplies a load 1 in accordance with the present invention. Load 1 is generally associated with a power converter such as a switched mode power supply system. Load 1 may also be associated with other circuits, such as circuits for correcting the power factor.

Rectifier 12 is connected to two terminals E1 and E2 of an a.c. power supply, for example the mains. Rectifier 12 generates, on two terminals P and M between which storage capacitor Cf is placed, a d.c. rectified supply for load 1. The powering-on of rectifier 12 is performed by means of a power-on switch 4, automatic or manual, located upstream of rectifier 12 between terminal E1 and a terminal E3. According to the present invention, rectifier 12 is preferably a composite bridge including two diodes D1 and D2, and two controllable power switches K1 and K2. Switches K1 and K2 of the composite bridge 12 are controlled by a bridge controller 15 for limiting the current surge upon power-on of the bridge 12. Device 15 includes a detector 17 for detecting the differential voltage between terminals E3 and E2 and a switch controller 16 for controlling switches K1 and K2.

Significantly, and in accordance with the present invention, storage capacitor Cf and load 1 are directly connected to the output terminals P and M of bridge 12 with no interposed resistive components.

Detector 17 performs a zero voltage detection and authorizes the closing of switches K1 and K2. Detector 17 issues the authorization to switch controller 16 after a closing of the power-on switch 4 and only when the voltage across terminals E3 and E2 is approximately zero. Thus, the present invention limits the current surge in capacitor Cf by forcing the transient charge phase of capacitor Cf to start under a voltage which is as low (as close to zero) as possible. Afterwards, the zero voltage detection performed by detector 17 on terminals E3 and E2 corresponds to a zero crossing of the difference between the rectified a.c. voltage and the voltage across load 1.

An advantage of the present invention is that, by basing the control of switches K1 and K2 on a detection of the a.c. power supply, the current surge device of the present invention is entirely independent from the type of load 1 and the type of power converter.

Another advantage of the present invention is that the current surge limitation device operates at the mains voltage and frequency and does not require an auxiliary power supply for its control.

Figure 3:
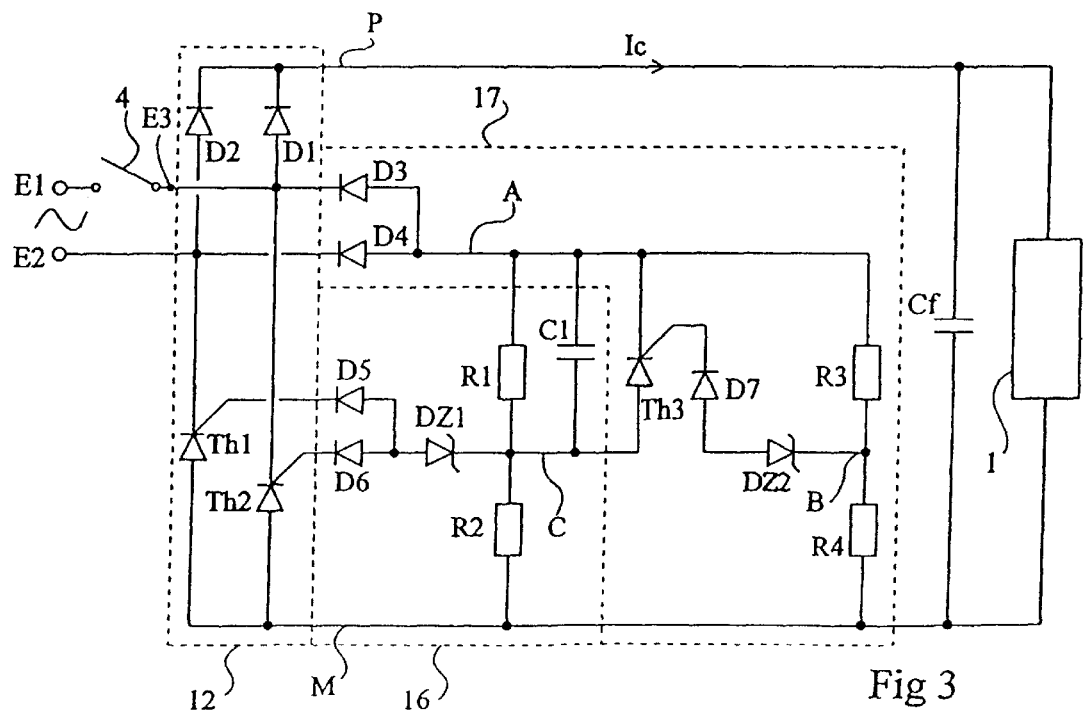
FIG. 3 is a detailed electric diagram of an embodiment of the device according to the present invention.
Figure 4A:
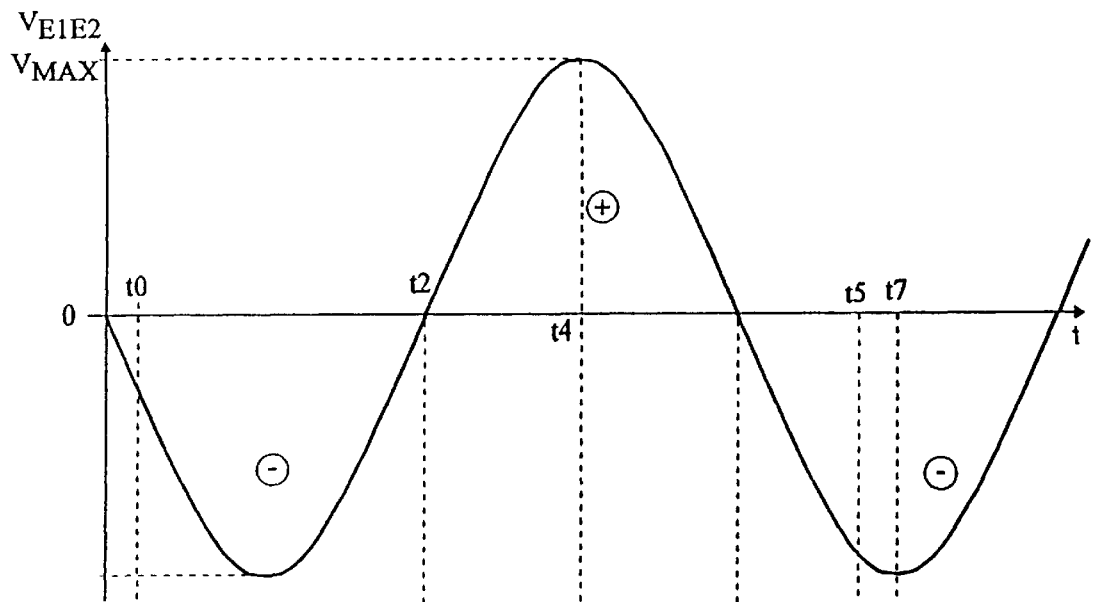
Figure 4B:
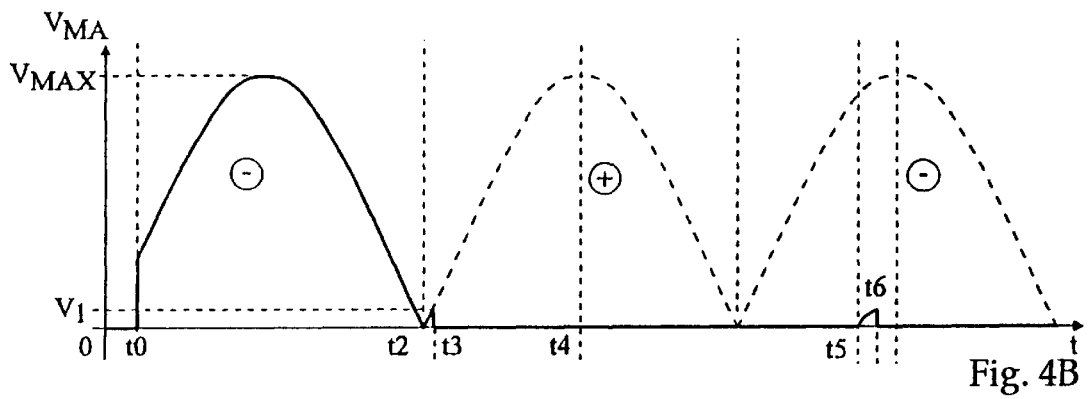
Figure 4C:
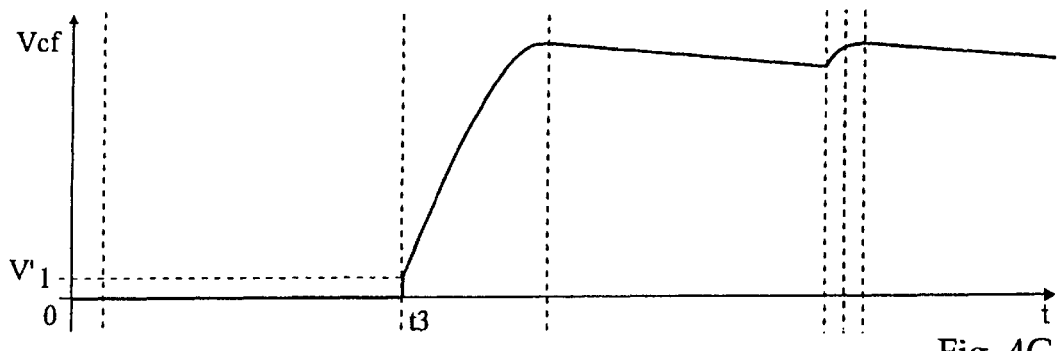
Figure 4D:
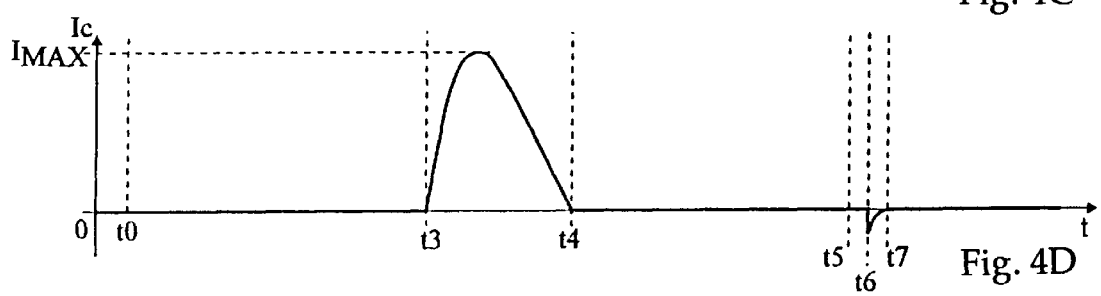

FIG. 3 is a schematic block diagram of a particularly simple embodiment of detection block 17 and switch control block 16 of the current surge limiting device of the present invention. Switches K1 and K2 are preferably thyristors, respectively Th1 and Th2, the respective cathodes of which are connected to terminals E2 and E3 and the anodes of which are connected to terminal M. Although the use of one-way conduction components to implement switches K1 and K2 has the advantage that these components also act as the lower diodes of a conventional diode bridge, two-way components can also be used. For example power, MOS transistors or triacs may be used as switches K1 and K2, each associated with appropriate diodes. In the illustrated embodiment, detection block 17 includes two rectifying diodes D3 and D4, the cathodes of which are connected, respectively, to terminals E3 and E2. The anodes of diodes D3 and D4 are connected to a node A.

The gates of thyristors Th1 and Th2 of bridge 12 are, respectively, connected to the cathodes of two diodes D5 and D6 which constitute the control outputs of block 16. The anodes of diodes D5 and D6 are connected to the anode of a Zener diode DZ1, the cathode of which is connected to a midpoint C of a first dividing bridge. This first dividing bridge includes resistors R1 and R2 mounted in series between node A and terminal M. A capacitor C1 and an auxiliary thyristor Th3 are mounted in parallel to resistor R1. The gate of thyristor Th3 is connected, via the series association of a diode D7 and a Zener diode DZ2, to the midpoint B of a second dividing bridge. This second dividing bridge includes two resistors R3 and R4 connected in series between node A and terminal M.

Resistors R1, R2, R3 and R4 have resistance values so that the voltage $V_{CA}$ across capacitor C1 is higher than the voltage $V_{BA}$ across resistance R3, regardless of the difference of potential between terminal M and node A ($V_{MA}$). The primary function of Zener diodes DZ1 and DZ2 is to set thresholds for the control of thyristors Th1 and Th2 around the zero of the a.c. voltage in the transient state, and then around the zero of the difference of potential between the absolute value of the a.c. voltage and the voltage across capacitor Cf in a steady state.

The function of capacitor C1 is to dampen the abrupt variations of the supply voltage to avoid, by means of thyristor Th3, the turning-on of one of thyristors Th1 or Th2. Thyristor Th3, when on, forbids the turning-on of a thyristor Th1 or Th2, since it short-circuits capacitor C1 and resistance R1, thereby preventing the conduction of Zener diode DZ1.

Figure 6:
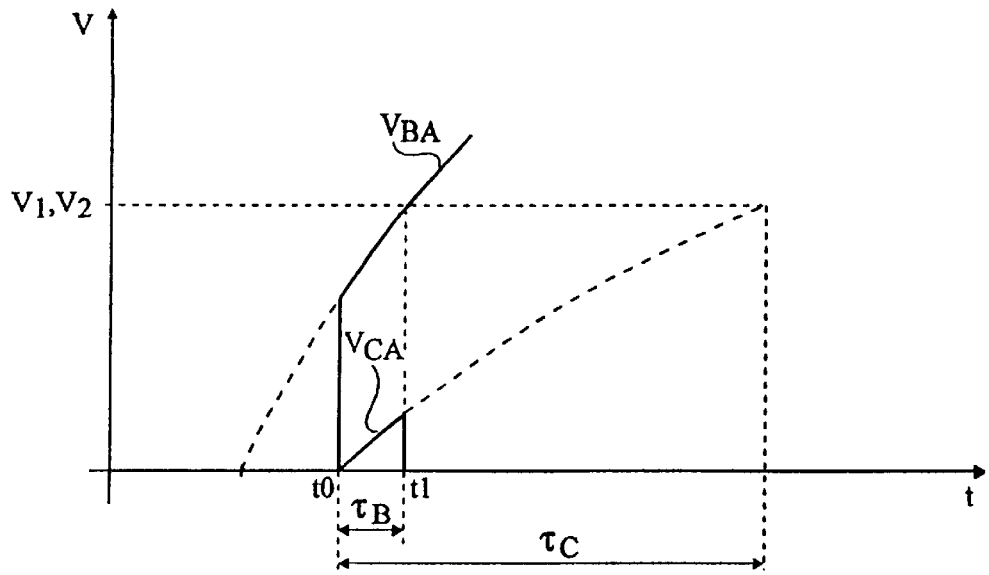
FIG. 6 shows the variations of control voltages upon power-on of a device according to the present invention.

The operation of the device shown in FIG. 3 is described hereafter in relation with FIGS. 4 through 7. FIGS. 4 to 6 illustrate the operation of the current surge limiting device according to the present invention upon power-on of rectifier 12. The operation illustrated in FIGS. 4 to 6 are based upon the assumption that power-on switch 4 does not cause the mains voltage to bounce upon its switching to the "on" state.

FIGS. 4A–4D show timing diagrams of the a.c. supply voltage $V_{E1E2}$, of voltage $V_{MA}$, of voltage $V_{Cf}$ across capacitor Cf, and of the current $I_C$ flowing through the positive rectified power supply line. FIGS. 5A–5E show timing diagrams of voltages $V_{BA}$ and $V_{CA}$ and respective states (on or off) of thyristors Th1, Th2 and Th3. Voltage $V_{E1E2}$ corresponds to the mains voltage, for example a voltage of 220 volts at a frequency of 50 Hertz. When power-on switch 4 is open, all the signals shown in FIGS. 4 and 5 are at zero. In FIGS. 5C–5E, the "on" periods of thyristors Th1, Th2 and Th3 are symbolized by a state 1, the thyristors being off in state 0.

It is assumed that the power-on switch 4 is closed at a time $t_0$ sometime during a negative half-wave of voltage $V_{E1E2}$. Diodes D3 and D4 behave as a rectifier and voltage $V_{MA}$ corresponds to voltage $V_{E1E2}$ rectified. The voltage drop in diodes D3 and D4 is negligible and therefore not considered. This approximation has no effect on the operation of the present invention, since diodes D5 and D6 impose an identical voltage drop between Zener diode DZ1 and the gates of thyristors Th1 and Th2. Diodes D3 and D4 are forward biased, respectively, during the negative and positive half-waves of the mains.

At time $t_0$, voltage $V_{MA}$ increases abruptly to reach the absolute value of voltage $V_{E1E2}$. Voltage $V_{BA}$ (FIG. 5A) follows voltage $V_{MA}$ (FIG. 5B) with a smaller amplitude due to the effect of dividing bridge R3–R4. Conversely, voltage $V_{CA}$ does not exhibit a peak at time $t_0$ due to the damping performed by capacitor C1. Indeed, although the resistive bridges have been assigned values so that voltage $V_{CA}$ is greater than voltage $V_{BA}$, this is not the case during the transient state associated with the closing of the switch 4 due to the presence of capacitor C1. This phenomenon is better illustrated by FIG. 6 which shows the waveforms of voltages $V_{BA}$ and $V_{CA}$ at the beginning of the transient state.

In accordance with the present invention, the capacitor C1 has a capacitance such that the delay $\tau_C$ imposed by capacitor C1 for voltage $V_{CA}$ to reach threshold voltage $V_1$ of Zener diode DZ1 is very large with respect to the time $\tau_B$ required by voltage $V_{BA}$ to reach threshold voltage $V_2$. In FIG. 6, it has been assumed that at time $t_0$ voltage $V_{MA}$ is such that voltage $V_{BA}$ is lower than voltage $V_2$.

At a time $t_1$, voltage $V_{BA}$ reaches the threshold voltage $V_2$ for triggering thyristor Th3, which then short-circuits resistor R1 and capacitor C1. Voltage $V_{CA}$ thus drops, preventing thyristors Th1 and Th2 from turning on. Thus, capacitor C1 prevents the turning-on of one of thyristors Th1 or Th2 of bridge 12 during a half-wave of the mains. Without capacitor C1, voltage $V_{CA}$ would vary faster than voltage $V_{BA}$, which would forbid the turning-on of thyristor Th3. This phenomenon is actually used, as will be seen hereafter, at the following half-waves to turn on one of thyristors Th1 or Th2. The threshold voltage of Zener diode DZ1 prevents the simultaneous conduction of thyristors Th1 and Th2.

Substantially at a time $t_2$ (FIGS. 4 and 5) where voltage $V_{E1E2}$ approaches zero, thyristor Th3 turns off. As a result, at the beginning of the following positive half-wave, voltages $V_{BA}$ and $V_{CA}$ will each grow as sine functions from a zero voltage. Indeed, capacitor C1 is ineffective in this case due to the low frequency (for example, 50 or 60 Hertz) of the mains. Conversely, voltage $V_{CA}$ then varies much faster than voltage $V_{BA}$ due to the sizing values of resistive bridges R1–R2 and R3–R4. Thus, voltage $V_{CA}$ (FIG. 5B) reaches the threshold voltage V1 set by Zener diode DZ1 (and one of diodes D5 or D6), before voltage $V_{BA}$ has been able to reach (at time $t'_1$) the threshold voltage V2 set by Zener diode DZ2 (and diode D7) and thus, before thyristor Th3 starts.

At a time $t_3$ where voltage $V_{CA}$ reaches threshold voltage $V_1$, bridge 12 is turned on by the turning-on of one of its thyristors and capacitor Cf will begin to charge.

If the first zero crossing which follows the closing of power-on switch 4 is followed by a positive half-wave, the conducting thyristor is thyristor Th1. The turning-on of thyristor Th1 at time $t_3$ connects terminals A and M, causing voltage $V_{MA}$ to fall. Thus, the device according to the present invention results in no power consumption while the rectifier conducts.

In the middle of the positive half-wave (instant t4), thyristor Th1 turns off since it is then reverse-biased. The voltage drop across on-thyristor Th1 is negligible and therefore not considered. In the following half-wave and as the charge of capacitor Cf becomes lower than the absolute value of the a.c. supply voltage (time $t_5$), voltage $V_{MA}$ begins to rise again in following the shape of voltage $V_{E1E2}$ but starting from a zero potential. Indeed, voltage $V_{MA}$ remains equal to zero between times $t_4$ and $t_5$, with diodes D3 and D4 preventing the charging of capacitor C1.

At a time $t_6$ when voltage $V_{CA}$ reaches voltage $V_1$, thyristor Th2 turns on and capacitor Cf completes its charge until the middle of the negative half-wave (time $t_7$). It should be noted that the slight delay ($t_6$–$t_5$) due to the charge complement of capacitor Cf is not impairing since the occurrence of time $t_5$ is a function of the charging needs of capacitor Cf.

After, in a steady state, the operation of times $t_5$ to $t_7$ is repeated for each half-wave, thyristor Th1 or Th2 being on at time $t_5$ before voltage $V_{BA}$ has been able to start thyristor Th3.

Referring to FIG. 4, capacitor Cf starts to charge at time $t_3$ under a very low voltage V'1 which corresponds to the threshold voltage V1 of Zener diode DZ1. Capacitor Cf then charges by substantially following a sine shape between time t3 and the middle of the half-wave (time t4). The maximum value Imax of current Ic is given by the relation (Vmax)(C1)($\omega$), where Vmax is the peak amplitude of the a.c. power supply voltage, and where $\omega$ is the mains pulse.

In the diagram of FIG. 4, it has been assumed that capacitor Cf reaches its maximum level at the first charge half-wave. Notably, the operation of the device according to the invention is not altered if capacitor Cf needs several half-waves to reach its maximum charge level.

Significantly, the present invention delays the power-on of the rectifier 12 until the first zero crossing of the supply voltage that follows the half-wave during which the switch 4 is closed. The threshold voltages of Zener diodes DZ1 and DZ2 can be equal or different, provided that, in a steady state, voltage $V_{CA}$ reaches voltage V1 before voltage $V_{BA}$ has reached voltage V2. Capacitor C1 avoids any turning-on of one of thyristors Th1 and Th2 in an abrupt variation of the mains voltage, while the values of resistive bridges R1–R2 and R3–R4 prevent, at low frequencies, any turning-on of thyristor Th3 before voltage $V_{CA}$ reaches the threshold voltage set by Zener diode DZ1.

According to the invention, the threshold voltages of Zener diodes DZ1 and DZ2 have low values (for example, from 2 to 5 volts) so that the turning-on of one of thyristors Th1 or Th2 occurs as close as possible to the beginning of the half-wave in the transient state and to time $t_5$ when the absolute value of the mains voltage becomes higher than the charge of capacitor Cf (or than the voltage across load 1) in a steady state.

The present invention limits the current surge at the initial charge of capacitor Cf by minimizing power losses. Indeed, the consumption of the device according to the invention is limited to the consumption of detector 17 and switch controller 16 (FIG. 3) during the half-wave in which power-on switch 4 is closed. Afterwards, the device consumes essentially no power between times $t_2$ and $t_3$, and times $t_5$ and $t_6$, before the turning-on of one of thyristors Th1 or Th2. During the remainder of each half-wave, no power consumption is added to the consumption of rectifying bridge D1–D2–Th1–Th2.

Another advantage of the present invention is that the control of rectifier 12 by means of switch controller 16 occurs independently of load 1. Thus, the limiting device of the present invention can be associated with any load. Further, the device automatically adjusts to a change of the capacitive characteristics of load 1. For example, if the load 1 becomes purely resistive in a steady state, which is, for example, the case for a device for correcting the power factor, the times $t_5$ of the steady state correspond to the zero crossings of the a.c. voltage.

Another advantage of the present invention is that the operation of the device is not linked to the a.c. supply voltage or to its frequency, provided that the period remains very large with respect to the time constant imposed by capacitor C1 and hat the mains voltage is higher than the threshold voltages defined by device 15.

Figure 7A:
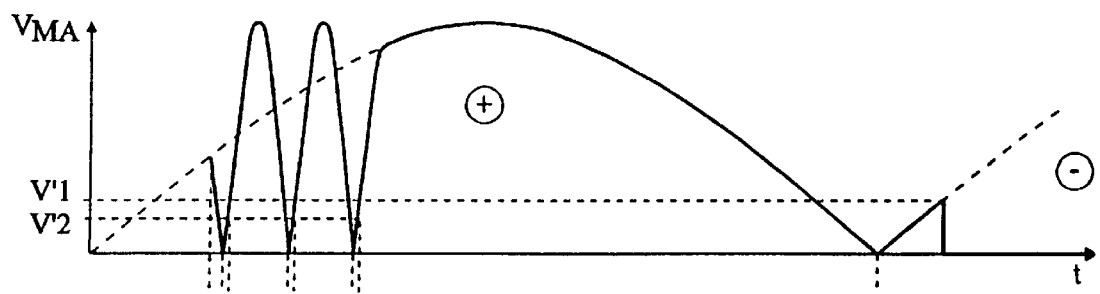
FIGS. 7A–7C illustrates, in the form of timing diagrams, the effects of a device according to the present invention over voltage bounces of the a.c. power supply line which are due to bounces of a power-on switch.
Figure 7B:
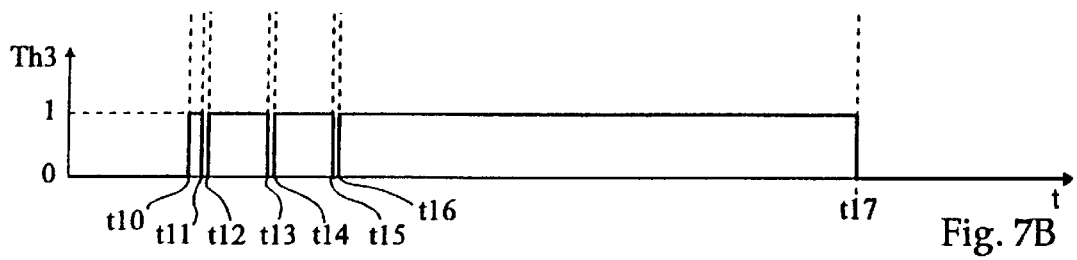
Figure 7C:
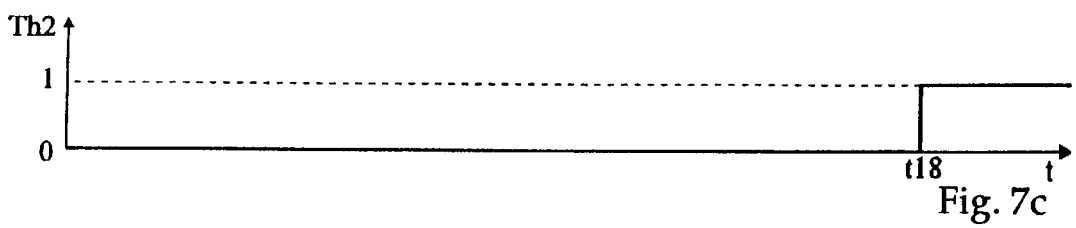

FIG. 7 illustrates the operation of the device according to the invention when bounces accompany the closing of power-on switch 4 (FIG. 3). FIG. 7 shows timing diagrams of voltage $V_{MA}$ as well as the "on" states of thyristors Th2 and Th3. It is assumed that power-on switch 4 takes the "on" position at a time $t_{10}$ during a positive half-wave. In the example shown, the switching to the "on" position of power-on switch 4 occurs at a time where voltage $V_{MA}$ is already higher than thresholds V'1 and V'2 which correspond, respectively, to the threshold voltages V1 and V2 of Zener diodes DZ1 and DZ2. As shown in FIG. 7, the threshold voltages of Zener diodes DZ1 and DZ2 are assumed to be different. However, they may have the same value in alternative embodiments.

The switching to the "on" position of power-on switch 4 is accompanied by bounces which take the form, on voltage $V_{MA}$, of rectified pulses at a very high frequency (for example, of around one megahertz) with respect to the mains voltage. At time $t_{10}$, thyristor Th3 immediately enters conduction since voltage $V_{BA}$ exceeds threshold voltage V2. Thyristor Th3 remains in the "on" position as long as the bounce pulse does not transit through zero. It is assumed that at a time $t_{11}$, the bounce transits through the zero voltage, which results in the turning-on of thyristor Th3.

Since the bouncing frequency is very high, capacitor C1 will act as a damper of voltage $V_{CA}$ at the beginning of each new bounce pulse. Thus, thyristor Th3 turns on at times $t_{12}$, $t_{14}$ and $t_{16}$ which correspond to times where voltage $V_{MA}$ reaches voltage V'2. Each time the bounce pulses transit through zero (times $t_{11}$, $t_{13}$ and $t_{15}$), thyristor Th3 turns off.

When the bounces disappear, voltage $V_{MA}$ starts to follow the absolute value of the mains voltage which has stabilized and thyristor Th3 turns off at a time $t_{17}$ corresponding to the end of the half-wave. At a time $t_{18}$, the operation previously described in relation with time $t_3$ occurs again.

An advantage of the present invention is that it prevents the powering-on of the rectifier during the bounces which accompany the switching of power-on switch 4 to the "on" position. It should be noted that the operation of the device according to the invention is not affected by the fact that the bounces mask a zero crossing of the mains voltage. Indeed, in this case, the powering-on of rectifier 12 is delayed, according to the invention, until the zero crossing which follows the last bounce connected with the switching of power-on switch 4 to the "on" position.

Another advantage of the present invention is that it blocks the supply of rectifier 12 until the zero crossing of a half-wave in case of a micro-failure of the mains. That is, as soon as the a.c. mains voltage becomes zero, even in the middle of a half-wave, the thyristor Th1 or Th2 which was on, turns off. This activates detector 17 and thus delays the powering-on of rectifier 12 at the beginning of the half-wave which follows the end of the micro-failure. The operation of the device in case of a micro-failure can be inferred from the description of the operation of the device in the presence of bounces illustrated by FIGS. 4 to 7. If the micro-failure does not result in the full discharge of capacitor Cf, the bridge is powered-on again at a time $t_5$ (FIGS. 4, 5) which follows the zero crossing of the restored mains voltage.

Another advantage of the present invention is that it causes no significant current surge in case of a variation of the mains voltage in the middle of a half-wave. Indeed, so long as the a.c. voltage is not zero, the device according to the invention is deactivated.

Further, even if the amplitude of the mains voltage drops significantly, over several half-waves, resulting in a lower maximum charge level of capacitor Cf, the restoring of capacitor Cf at the initial charge level occurs as soon as the mains voltage recovers this original level without there being a current peak on the rectified power supply line. It is thus found that, even during the charge of capacitor Cf, the device according to the invention detects any irregularity in the a.c. supply voltage which would be likely to generate a current peak at the rectified supply line.

In the presence of such an irregularity, be it a microfailure or high-frequency bounces, the device cuts off rectifier 12 and waits for voltage $V_{E1E2}$ to have stabilized (that is, come back to a frequency close to its nominal frequency) to restart the rectifier from a zero crossing of the mains voltage.

Another advantage of the present invention is that the device does not require an auxiliary rectified supply for its control. In addition, the capacitor C1 can be a low-voltage capacitor since the voltage across this capacitor never exceeds the threshold voltage set by Zener diode DZ1.

As a specific example of implementation, a device according to the invention can be implemented with components having the following values:

R1, R2, R3=1 kΩ;

R4=10 kΩ;

C1=200 nF; and

V1=V2=3.3 V.

According to another embodiment of the limiting device of the present invention, thyristors Th1 and Th2 are anode-gate thyristors and capacitor C1 as well as thyristor Th3 are mounted in parallel to resistance R2. An advantage of such an embodiment is that it makes it easier to form the present invention in an integrated circuit. The operation of the limiting device according to this embodiment can be inferred from that described hereabove.

Although the example of embodiment described hereabove refers to a single-phase a.c. power supply, adapting the device according to the invention to a multi-phase power supply is particularly simple. Indeed, the only alterations to bring to detectors 17 and switch controllers 16 are to add, for each additional phase, one diode in parallel with diodes D3 and D4 and one diode in parallel with diodes D5 and D6. The cathode of each additional diode is connected, respectively, to a supply terminal of the additional phase and to the gate of an additional thyristor constituting an additional branch of the rectifier.

Of course, the present invention is likely to have many alterations, modifications, and improvements which will appear to those skilled in the art. In particular, each of the components described can be replaced with one or several components performing the same function. For example, the thyristors can be replaced with MOS power transistors.

Thyristors Th1 and Th2 and diodes D1 and D2 of composite bridge 12 can also be inverted. That is, the cathodes of thyristors Th1 and Th2 can constitute the positive output terminal of the rectified supply, the anodes of diodes D1 and D2 constituting the negative output voltage or the ground.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalents thereto.

What is claimed is:

1. A device for limiting a current surge in a capacitor connected to the output of a rectifying bridge having its input connected to an a.c. power supply, wherein the bridge is a composite bridge including switches and at least two diodes and at least two thyristors, said device comprising, means for synchronizing the turning-on of the bridge from a voltage zero crossings of the a.c. power supply;

a detector for detecting the zero crossing of the voltage at the input of the composite bridge, said detector including at least two differential inputs receiving the a.c. power supply; and a controller for controlling said switches of said composite bridge, including, at least two outputs for respectively controlling said switches, and a second resistive voltage dividing bridge having its midpoint connected to the output of the detection block and, via a second Zener diode, to the anodes of at least two diodes, the respective cathodes of which constitute the outputs of the control block connected, respectively, to the gates of the thyristors of the composite bridge, a damping capacitor being mounted in parallel to the auxiliary thyristor, wherein each input of the detection block is connected to an input of the composite bridge via a rectifying diode, the anodes of the rectifying diodes being connected to an output terminal of the composite bridge via a first resistive voltage dividing bridge having its midpoint connected, at least via a first Zener diode, to the gate of an auxiliary thyristor, the anode of which constitutes an output of the detection block.

2. A control device according to claim 1, wherein the resistive dividing bridges are sized so that the voltage across the damping capacitor is, at low frequencies, always substantially higher than the voltage between the midpoint of the first resistive dividing bridge and the cathode of the auxiliary transistor.

3. A control device according to claim 2, wherein the cathode of the auxiliary thyristor is connected to the cathodes of the rectifying diodes of the detection block, the thyristors of the composite bridge being cathode-gate thyristors.

4. A device for limiting a current surge in a capacitor connected to the output of a composite rectifying bridge having its input connected to an a.c. power supply and including one or more thyristors and one or more diodes, each connected to one of said one or more thyristors, the device comprising:

a detector configured to detect a zero crossing of the voltage at the input of the rectifying bridge, wherein said detector further comprises:

a plurality of rectifying diodes, each having an anode and a cathode and connecting one of said plurality of differential inputs of said detector to an input of the composite bridge, a first resistive voltage dividing bridge having a midpoint, configured to connect said anodes of said rectifying diodes to an output terminal of the composite bridge, an auxiliary thyristor having a gate, a cathode and an anode, said anode forming an output of said detector, and a first Zener diode connected to said gate of said thyristor and said midpoint of said first resistive voltage dividing bridge; and a switch controller, responsive to said detector, configured to switch one or more thyristors of the composite bridge, said switch controller including, a second resistive voltage dividing bridge having a second midpoint connected to said output of said detector, at least two diodes each having an anode and a cathode, wherein said anodes of said at least two diodes are connected to said second midpoint and said cathodes of said at least two diodes form said plurality of switch controller outputs, a second Zener diode interposed between said anodes of said at least two diodes and said second midpoint, wherein said cathodes of said at least two diodes are connected, respectively, to said gates of said thyristors of the composite bridge, and a damping capacitor connected to said second midpoint and said anodes of said rectifying diodes, said damping capacitor being in parallel to said auxiliary thyristor, wherein said detector and said switch controller operate to synchronize operations of the bridge with a voltage zero crossings of the a.c. power supply.

5. The device according to claim 4, wherein said first and second resistive dividing bridges include resistors having values such that a voltage across said damping capacitor is, at low frequencies, substantially higher than a voltage between said first midpoint of said first resistive dividing bridge and said cathode of said auxiliary transistor.

* * * * *